(12) United States Patent
Eddy

(10) Patent No.: US 12,191,650 B2
(45) Date of Patent: Jan. 7, 2025

(54) LOW VOLTAGE IN-WALL POWER SYSTEM FOR MOTORIZED SHADES

(71) Applicant: Brett Eddy, Spanish Fork, UT (US)

(72) Inventor: Brett Eddy, Spanish Fork, UT (US)

(73) Assignee: SMART VOLT, LLC, Spanish Fork, UT (US)

(*) Notice: Subject to any disclaimer, the term of this patent is extended or adjusted under 35 U.S.C. 154(b) by 410 days.

(21) Appl. No.: 17/834,243

(22) Filed: Jun. 7, 2022

(65) Prior Publication Data
US 2023/0396049 A1    Dec. 7, 2023

(51) Int. Cl.
| | |
|---|---|
| E04B 2/70 | (2006.01) |
| E06B 9/322 | (2006.01) |
| E06B 9/323 | (2006.01) |
| E06B 9/42 | (2006.01) |
| E06B 9/72 | (2006.01) |
| H02G 3/36 | (2006.01) |
| E06B 9/68 | (2006.01) |

(52) U.S. Cl.
CPC .............. *H02G 3/36* (2013.01); *E06B 9/322* (2013.01); *E06B 9/323* (2013.01); *E06B 9/42* (2013.01); *E06B 9/72* (2013.01); *E04B 2/70* (2013.01); *E06B 2009/6809* (2013.01)

(58) Field of Classification Search
CPC . E04B 2/70; E06B 9/322; E06B 9/323; E06B 9/42; E06B 9/72; E06B 2009/6809; H02G 3/36; H02G 3/386; H02G 3/381; H02G 3/388; H02G 3/28; H02G 3/286; H02G 3/288

USPC ................... 52/220.1, 220.7, 220.8
See application file for complete search history.

(56) References Cited

U.S. PATENT DOCUMENTS

| | | | |
|---|---|---|---|
| 4,463,998 A | 8/1984 | Reavis et al. | |
| 9,608,455 B2 | 3/2017 | Byrne et al. | |
| 9,722,432 B2 | 8/2017 | Abe | |
| 10,190,365 B1* | 1/2019 | McSparrin | E06B 1/6023 |
| 10,273,687 B1* | 4/2019 | Walker | E04B 2/7429 |
| 11,223,218 B2 | 1/2022 | Nien et al. | |
| 2002/0144833 A1* | 10/2002 | Russell | H02G 3/386 |
| | | | 174/497 |
| 2004/0250964 A1* | 12/2004 | Carmen, Jr. | H05B 47/17 |
| | | | 160/120 |
| 2010/0192491 A1* | 8/2010 | Van Randen | E04C 2/521 |
| | | | 52/745.21 |
| 2014/0091638 A1 | 4/2014 | Azancot et al. | |
| 2014/0357125 A1* | 12/2014 | Byrne | H02G 3/105 |
| | | | 439/620.01 |
| 2017/0081917 A1* | 3/2017 | Brunk | E06B 9/72 |
| 2017/0114593 A1* | 4/2017 | Hebeisen | E06B 9/17007 |
| 2017/0159352 A1* | 6/2017 | Cooper | E06B 9/72 |

(Continued)

FOREIGN PATENT DOCUMENTS

| | | |
|---|---|---|
| CN | 202611511 U * | 12/2012 |
| CN | 107481634 A | 12/2017 |

(Continued)

*Primary Examiner* — Beth A Stephan
(74) *Attorney, Agent, or Firm* — PETERSON IP; Brett Peterson

(57) ABSTRACT

A building electrical system provides electrical mounting plates which are embedded inside of building walls. The electrical mounting plates provide power to low voltage electrical fixtures such as motorized window coverings and allow the fixtures to be mounted and operated without external wiring.

20 Claims, 10 Drawing Sheets

(56) References Cited

U.S. PATENT DOCUMENTS

2020/0136363 A1* 4/2020 Seo .......................... H02G 3/38
2021/0310240 A1* 10/2021 Vilhauer ................... E04B 2/56

FOREIGN PATENT DOCUMENTS

| | | |
|---|---|---|
| CN | 211508616 U | 9/2020 |
| CN | 213205374 U | 5/2021 |
| CN | 214674558 U | 11/2021 |
| JP | 04082107 A | 3/1992 |
| JP | 04289716 A | 10/1992 |
| JP | 05044334 A | 2/1993 |
| JP | 2009159683 A | 7/2009 |

* cited by examiner

LOW VOLTAGE IN-WALL POWER SYSTEM FOR MOTORIZED SHADES

THE FIELD OF THE INVENTION

The present invention relates to a power system for window coverings such as motorized shades. In particular, examples of the present invention relate to a system for providing low voltage power to building fixtures such as motorized shades without requiring external wiring and power supplies or nearby building power outlets.

INTRODUCTION

Many people want to install electrical fixtures such as motorized shades, electrically dimming windows, or cabinet lighting in homes and businesses to improve the aesthetic appeal and convenience of the building.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1A:
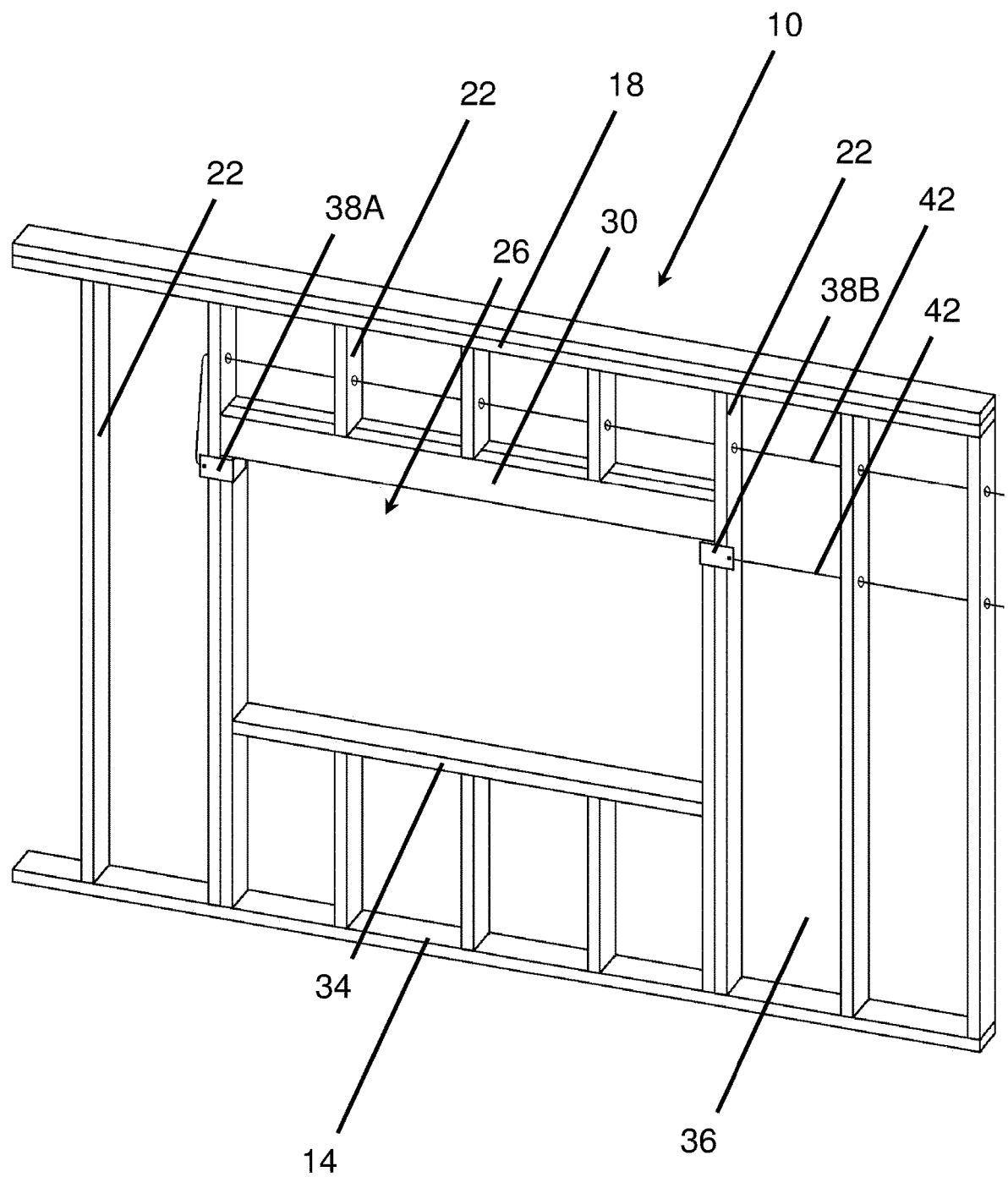
FIG. 1A shows a wall with an electrical distribution system of the present invention.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

The disclosure particularly describes a system which provides electricity to low power home fixtures such as motorized shades and blinds, auto darkening windows, etc. Particularly, the present disclosure describes a system which eliminates exposed wiring to fixtures such as motorized shades and blinds. Currently, motorized shades and blinds are installed at a building window and power is provided to the fixture through a small electrical transformer which is plugged into a nearby mains power outlet in the building wall. An electrical cord runs along the wall from the electrical transformer to the motorized shade. This electrical cord is typically fastened to the wall or trim around the window, down to the floor, and over to the mains power outlet. The exposed wiring and power supply is unsightly, difficult to keep clean, and can be a hazard to children and pets.

FIG. 1A shows a framed building wall 10 with a novel low voltage power distribution system. The example wall 10 is framed with wood and incudes a bottom plate 14, top plate 18, and a plurality of vertical studs 22. The wall 10 includes a window opening 26 which is framed by a header 30 and a sill plate 34. The wall 10 is shown with an exterior panel 36 but is shown without an interior finishing panel (e.g., a gypsum or plaster board such as sheetrock) to better illustrate the power distribution system. In use, the wall is part of a finished building such as a house and is finished with interior and exterior paneling. Electrical mounting plates 38 are attached to the wall 10. The electrical mounting plates 38 are attached to wall framing members such as studs 22 or header 30 at desired locations such as at the upper corners of the window opening 26. The electrical mounting plates are embedded in the wall 10. The electrical mounting plates 38 are attached to the wall framing members on the interior side of the wall and a wall finishing panel such as sheetrock is then attached to the wall; covering the electrical mounting plates 38 so that the electrical mounting plates 38 are embedded in the wall between the framing members and the interior finishing panel/sheetrock. The interior finishing panel is an insulating material and the electrical mounting plates 38 are physically and electrically isolated from the finished surface of the wall 10.

Each electrical mounting plate 38 is typically between about 3 and about 6 inches tall and between about 4 and about 8 inches wide. More commonly, each electrical mounting plate is about 3 or 4 inches in length and width. Each electrical mounting plate 38 is thin, typically between about 0.02 and about 0.06 inches thick. The example electrical mounting plates 38 are metal sheets. An example electrical mounting plate 38 is made of steel and may be galvanized or zinc or copper plated. The end of the wire 42 may be terminated with an electrical terminal such as a ring terminal and may be electrically attached to the electrical mounting plate by a bolt or screw. The wire 42 may alternately be crimped, soldered, or welded to the electrical mounting plate 38. The wires 42 typically include a metal (copper) conductor which is about 0.05 inches in diameter. Accordingly, the electrical mounting plates 38 have a length and a width that is more than 10 times or more than 15 times the diameter/width/thickness of the wire conductor. Preferably, the electrical mounting plates have a length and a wight that is more than 20 times the thickness of the wire conductor. In many embodiments, the electrical mounting plates have a length and a width which is more than 50 times the thickness of the wire conductor.

Each electrical mounting plate 38 is electrically connected to power wires 42 which are installed in the wall 10. The power wires 42 are typically installed through holes which are drilled through the studs 22 to allow the power wires 42 to pass through the wall 10 to a desired location. The power wires 42 connect the electrical mounting plates 38 to a power supply which is disposed remotely from the window 26. The power supply is typically a transformer which supplies low voltage electricity to the electrical mounting plates 38 via the wires 42. For a house with motorized shades on multiple windows 26, a single power supply may be located at a remote location in the house such as the utility room. The power supply may be connected to multiple electrical mounting plates 38 via multiple wires 42 and may provide power to all motorized shades throughout the building or throughout a section of the building. The electrical mounting plates 38 are mounted in pairs with a first mounting plate 38A and a second mounting plate 38B that complement each other as part of an electrical circuit. For the example window 26, the electrical mounting plates 38A, 38B are connected to the power supply via wires such that they are of opposite electrical polarity (e.g., DC+ and DC−) and are connected to a motorized window covering so that the window covering completes the electrical circuit and power is provided to the window covering via the electrical mounting plates 38A, 38B. The electrical mounting plates 38 may be attached to the wall 10 and to the power supply in a predetermined configuration such as by connecting the electrical mounting plate 38A which is to the left of a window opening 26 to common (e.g., ground/neutral) and connecting the electrical mounting plate 38B which is to the right of a window opening 26 to positive voltage.

The electrical system is separate from the conventional building wiring and 110 volt building outlets installed into a building. The electrical system is preinstalled in a building while the building is under construction so that the electrical mounting plates 38 and wires 42 are installed in the relevant building walls 10 and are concealed within the finished building interior. Electrical mounting plates 38 are placed onto the framed walls 10 at predetermined locations to allow low power fixtures such as motorized window coverings to be mounted after the desired level of interior paint and finish work.

Figure 1B:
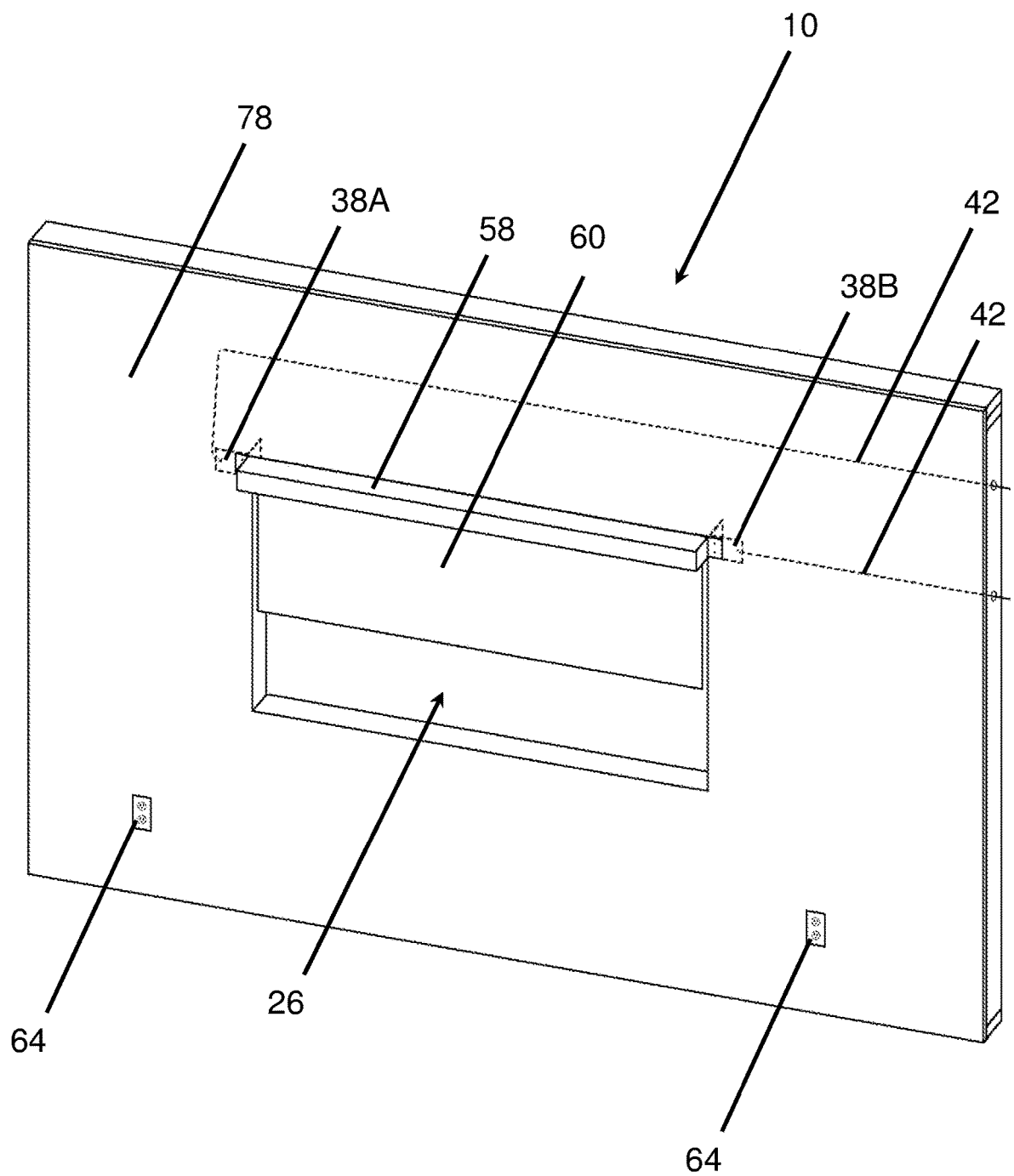
FIG. 1B is another drawing of the wall of FIG. 1.

FIG. 1B shows the wall 10 of FIG. 1A with the interior finishing panel 78 (sheetrock) installed on the interior face of the wall as well on the surfaces inside of the window opening 26. The interior finishing panel 78 covers the electrical mounting plates 38 and wires 42 so that these are embedded inside of the wall 10 and electrically isolated from the surface of the wall 10. FIG. 1B shows how a motorized window covering 58 is installed onto the wall 10. The example window covering 58 uses an internal controller and motor to raise and lower a window shade 60. The electrical distribution system provides power to the motorized window covering 58 via the embedded electrical mounting plates 38 and does not require the window covering 58 to be connected to conventional wall outlets 64 by exposed wires.

Figure 2:
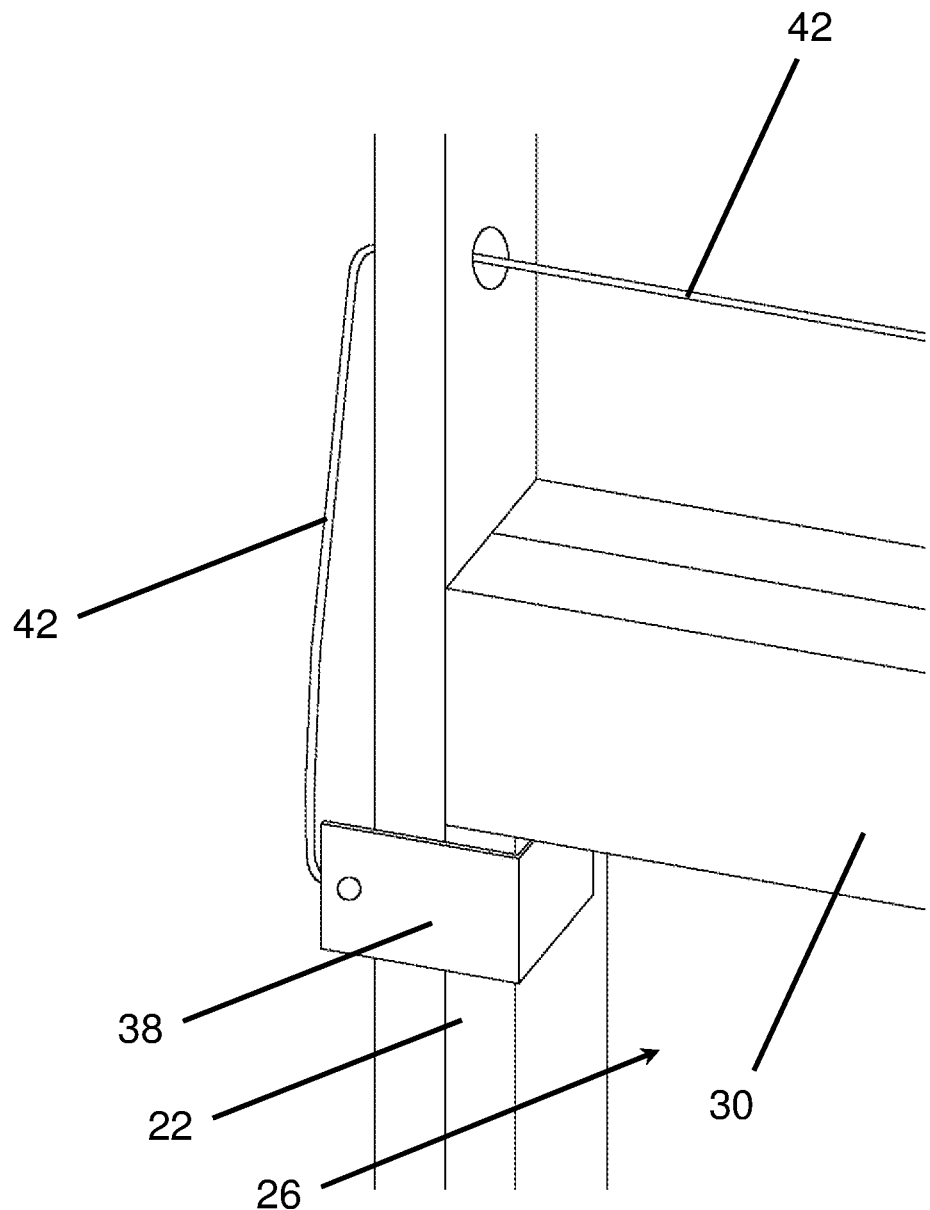
FIG. 2 shows a detailed drawing of the electrical distribution system.

FIG. 2 shows a detailed view of an electrical mounting plate 38 attached to the wall framing members around a window opening 26. FIG. 2 shows a portion of the studs 22 and header 30 around the window opening 26. The electrical mounting plate 38 is bent into an angle shape and is mounted to the studs 22 such that a portion of the electrical mounting plate 38 is disposed along the face of the wall 10 and a portion of the electrical mounting plate 38 is disposed along an upper portion of the side of the window opening 26. In this position, the electrical mounting plate 38 may be used to mount and provide power to a motorized window covering which is mounted on the inside side of the window opening or on the wall face to the side of the window opening 26.

Figure 3:
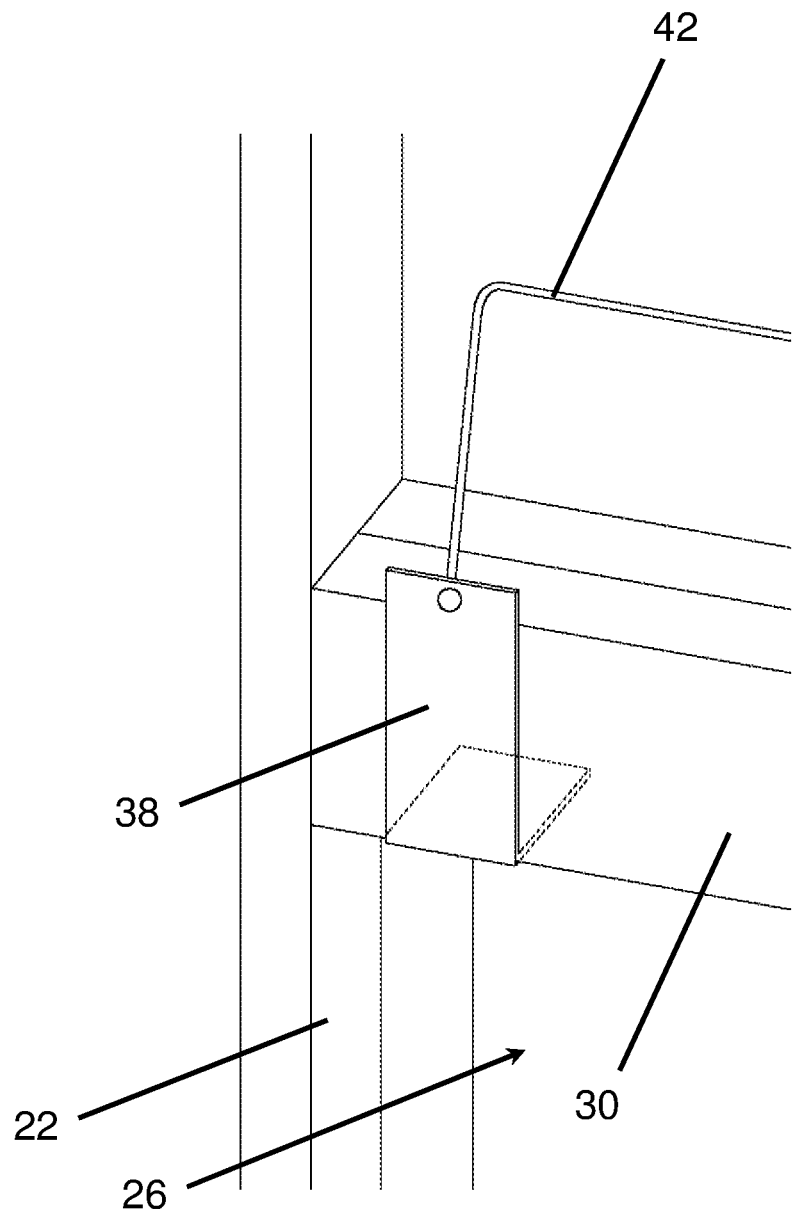
FIG. 3 shows another detailed drawing of the electrical distribution system.

FIG. 3 shows a similar detailed view of an electrical mounting plate 38 attached to the wall framing members around a window opening 26. The electrical mounting plate 38 is bent into an angle shape and is mounted to the window header 30 such that a portion of the electrical mounting plate 38 is disposed along the interior face of the wall 10 above the end of the window opening and a portion of the electrical mounting plate 38 is disposed along the side of the top of the window opening 26. In this position, the electrical mounting plate 38 may be used to mount and provide power to a motorized window covering which is mounted on the inside top of the window opening or on the wall face above the side of the window opening 26.

Figure 4:
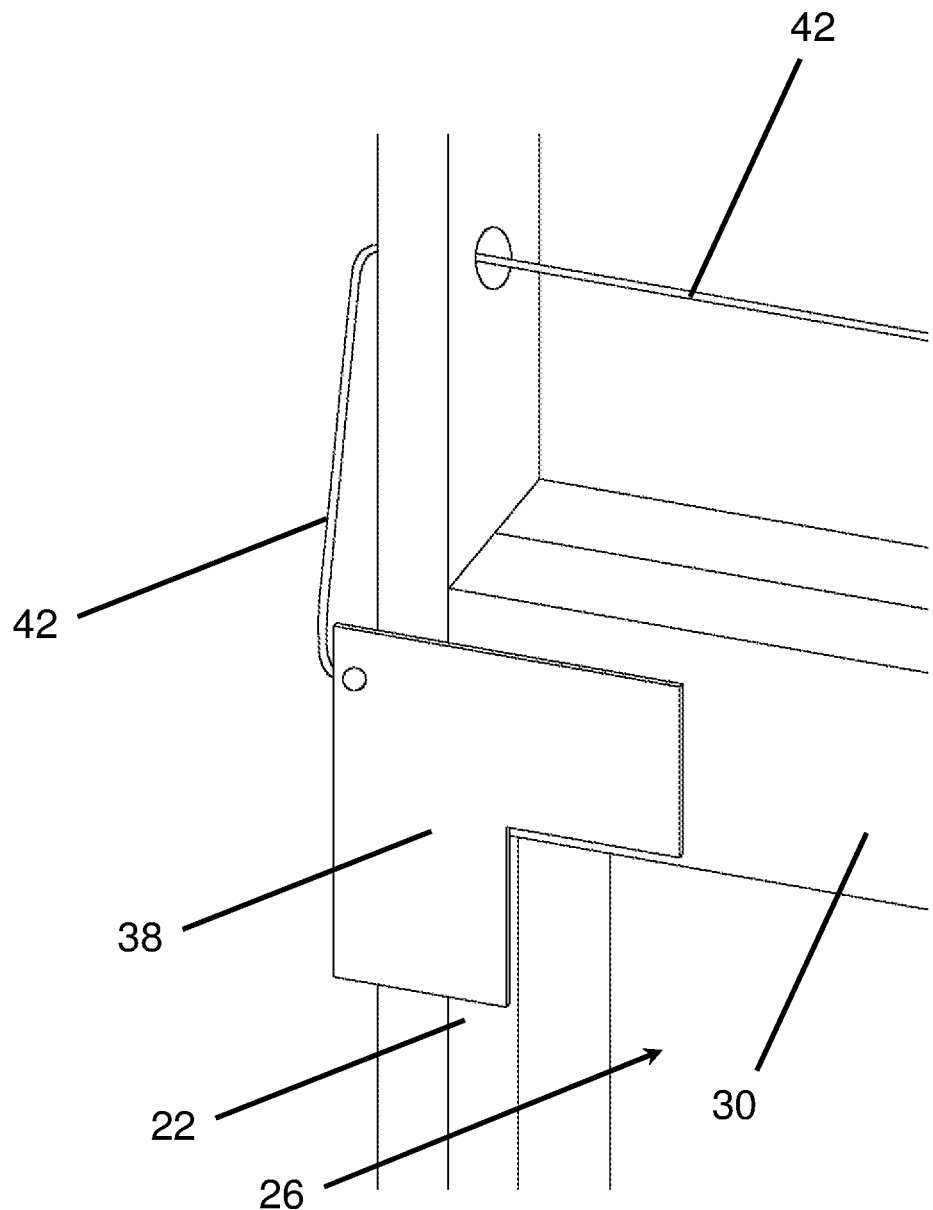
FIG. 4 shows another detailed drawing of the electrical distribution system.

FIG. 4 shows a similar detailed view of an electrical mounting plate 38 attached to the wall framing members around a window opening 26. The electrical mounting plate 38 is mounted to the window header 30 and/or wall studs on the face of the wall 10 near the upper corner of the window opening. The electrical mounting plate 38 may be L shaped so that the electrical mounting plate 38 is disposed along the side and along the top of the window opening 26 on the interior face of the wall 10. In this position, the electrical mounting plate 38 may be used to mount and provide power to a motorized window covering which is mounted on the wall face above or to the side of the window opening 26.

Figure 5:
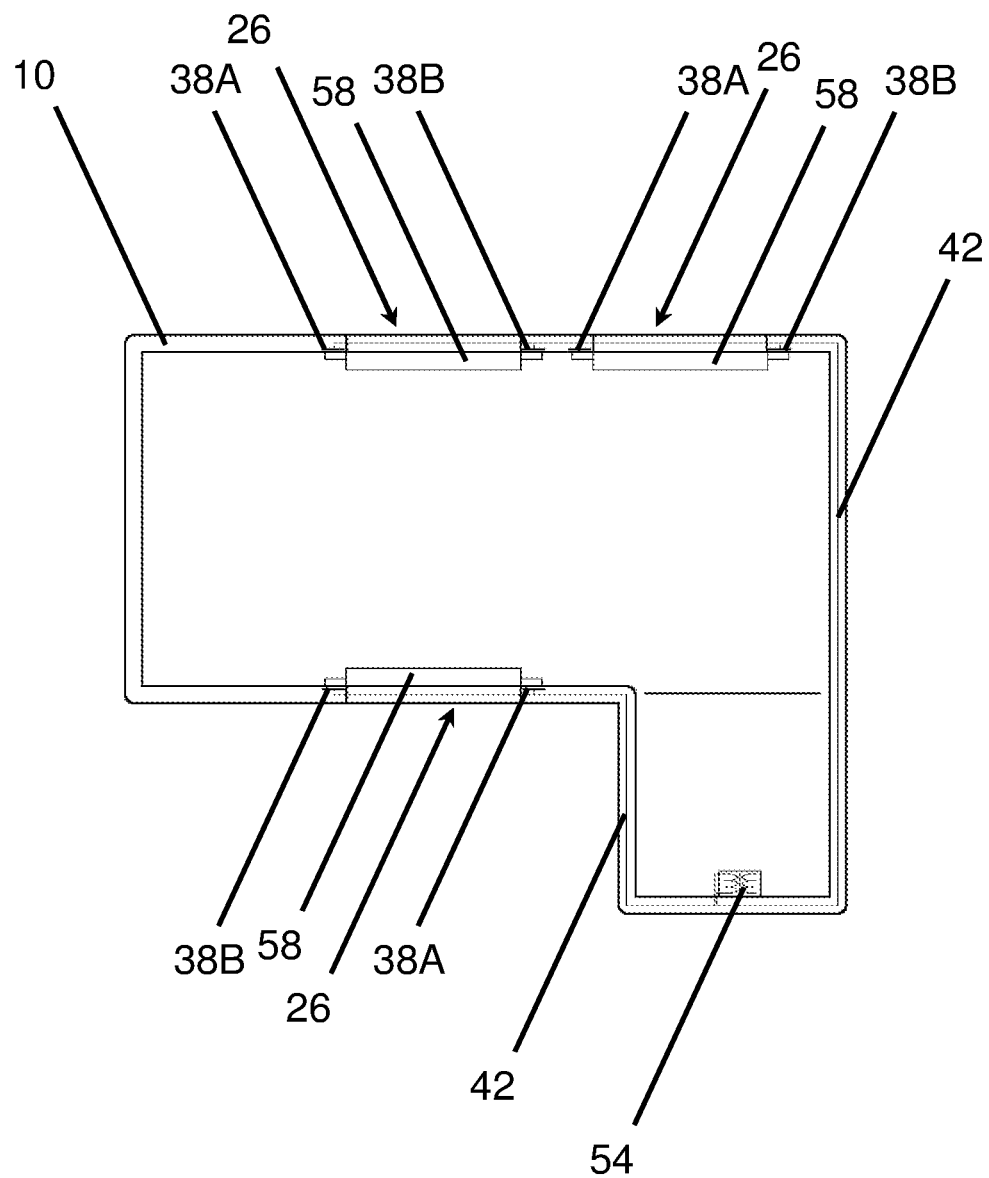
FIG. 5 shows another drawing of the electrical distribution system.

FIG. 5 shows a drawing of a simplified building floorplan. A first room includes three windows 26. A second room such as a utility room includes a power supply 54 used to provide power to motorized window coverings in the first room. A first electrical mounting plate 38A and a second electrical mounting plate 38B are mounted near the upper corners of each window opening 26. Each electrical mounting plate 38A, 38B is connected to the power supply 54 via wires 42. The electrical wires 42 are insulated wires which run through the walls 10. They are commonly installed through holes drilled in the wall studs. The power supply 54 is connected to the building mains power, typically through a 110 volt electrical outlet in the second room. The power supply outputs low voltage power which is a significantly lower voltage than the 110 volt or 220 volt building mains power, such as 12 volts or 24 volts and the low voltage power is carried to motorized shades 58 via the wires 42 and electrical mounting plates 38A, 38B. Electricity is carried to the motorized shades 58 by a mounting screw which attaches a shade mounting bracket to the wall. The mounting screw passes through the sheetrock (insulating interior wall panel) and penetrates the electrical mounting plate 38 and is fastened to the electrical mounting plate 38. The mounting screw is typically selected to form a hole and threads in the electrical mounting plate so that, when installed, the mounting screw passes through the electrical mounting plate and fits tightly into a threaded hole in the electrical mounting plate.

Figure 6:
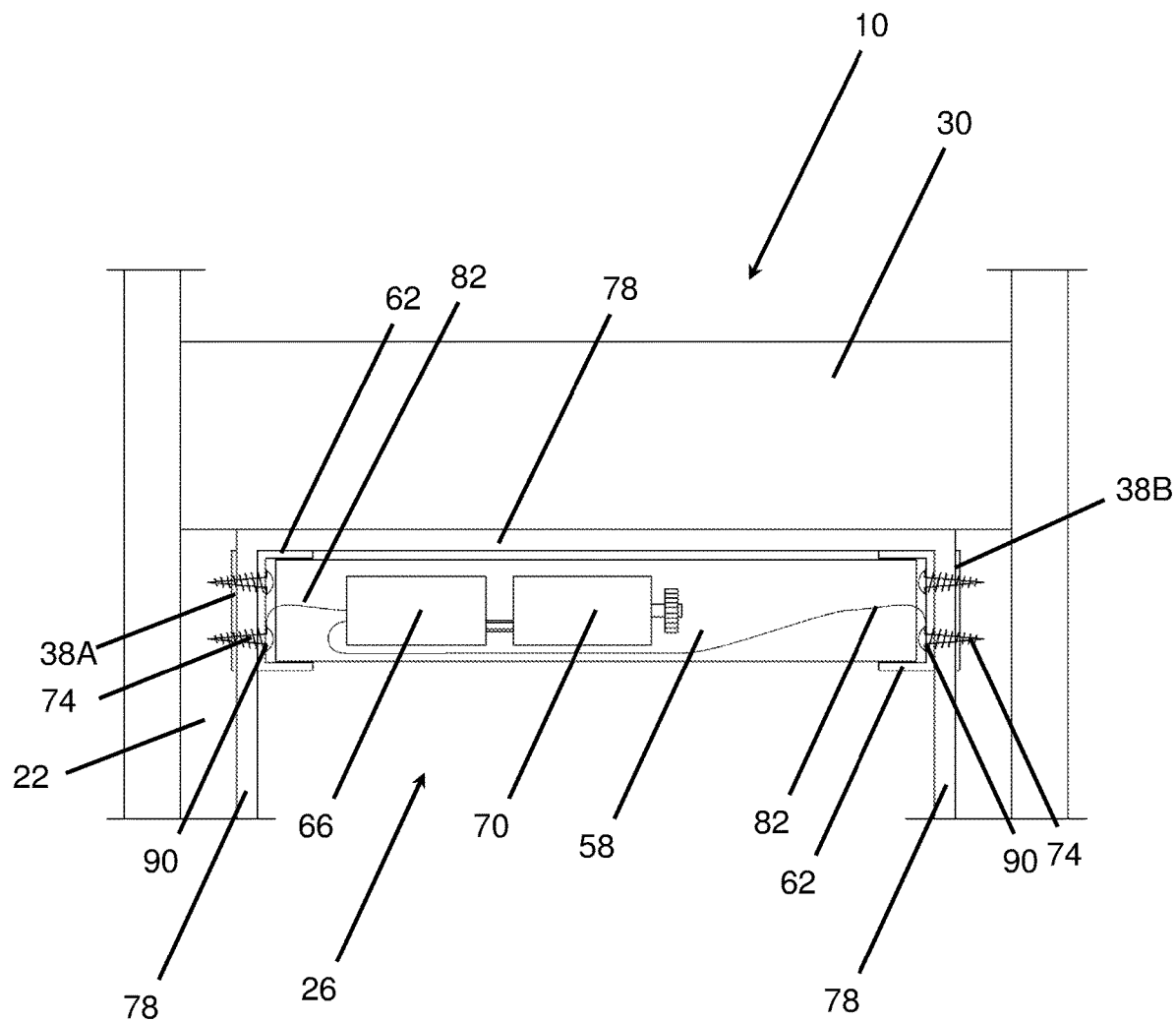
FIG. 6 shows another detailed drawing of the electrical distribution system.

FIG. 6 shows a detailed view of an installed motorized window covering 58. The window covering 58 is installed inside the window opening 26 along the top of the window opening 26. Mounting brackets 62 are used to mount the window covering 58 to the wall 10. The window covering 58 includes a controller 66 and a motor 70 which are used to open or close a window shade, curtain, etc. The mounting brackets 62 are attached to the wall 10 by mounting screws 74. As discussed, the wall includes framing members such as studs 22 and is covered by an electrically insulating wall panel 78 such as sheetrock. The electrical mounting plates 38 are embedded in the wall 10 beneath the sheetrock 78. The mounting screws 74 pass through holes in the mounting brackets 62, through the sheetrock 78, and through the electrical mounting plates 38. The mounting screws 74 make electrical contact with the electrical mounting plates 38 and thereby complete an electrical circuit to provide power to the motorized window covering 58. As shown, the window covering 58 may include power wires 82 which are connected to the controller 66 and which connect electrically to the screws 74. As shown, the power wires may extend out of the ends of the window covering housing and may be terminated with a ring terminal. The mounting screw 74 passes through the ring terminal, mounting bracket 62, sheetrock 78, and electrical mounting plate 38 to thereby electrically connect the electrical mounting plate to the controller 66. The mounting bracket 62 may be permanently attached to the window covering housing.

Figure 7:
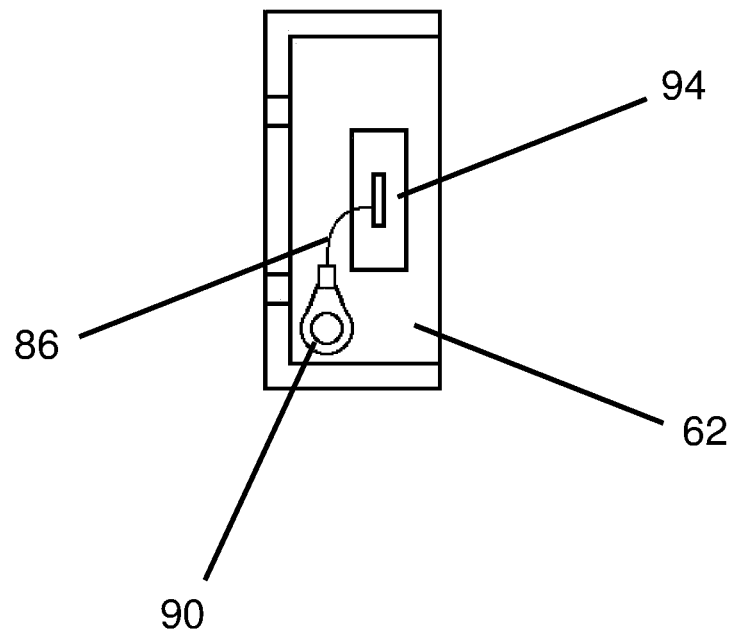
FIG. 7 shows a detailed drawing of the electrical system mounting bracket.
Figure 8:
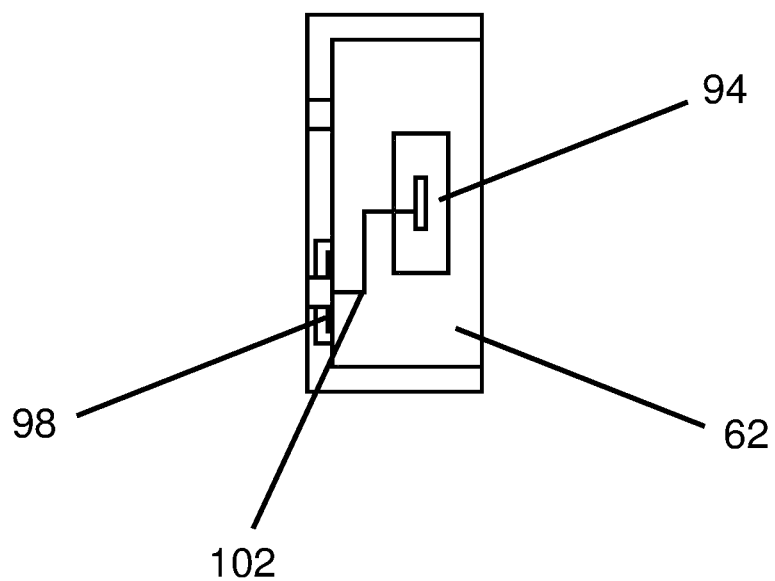
FIG. 8 shows a detailed drawing of the electrical system mounting bracket.

FIG. 7 shows how the mounting bracket 62 may alternately include a wire 86 and ring terminal 90 which are connected to an electrical socket 94. The electrical socket 94 is connected to a corresponding electrical connector on the window covering 58 when the window covering 58 is attached to the mounting bracket 62. FIG. 8 shows how the mounting bracket 62 may alternately include an electrical contact pad 98 and trace 102 which are connected to an electrical socket 94. The electrical socket 94 is connected to a corresponding electrical connector on the window covering 58 when the window covering 58 is attached to the mounting bracket 62.

Figure 9:
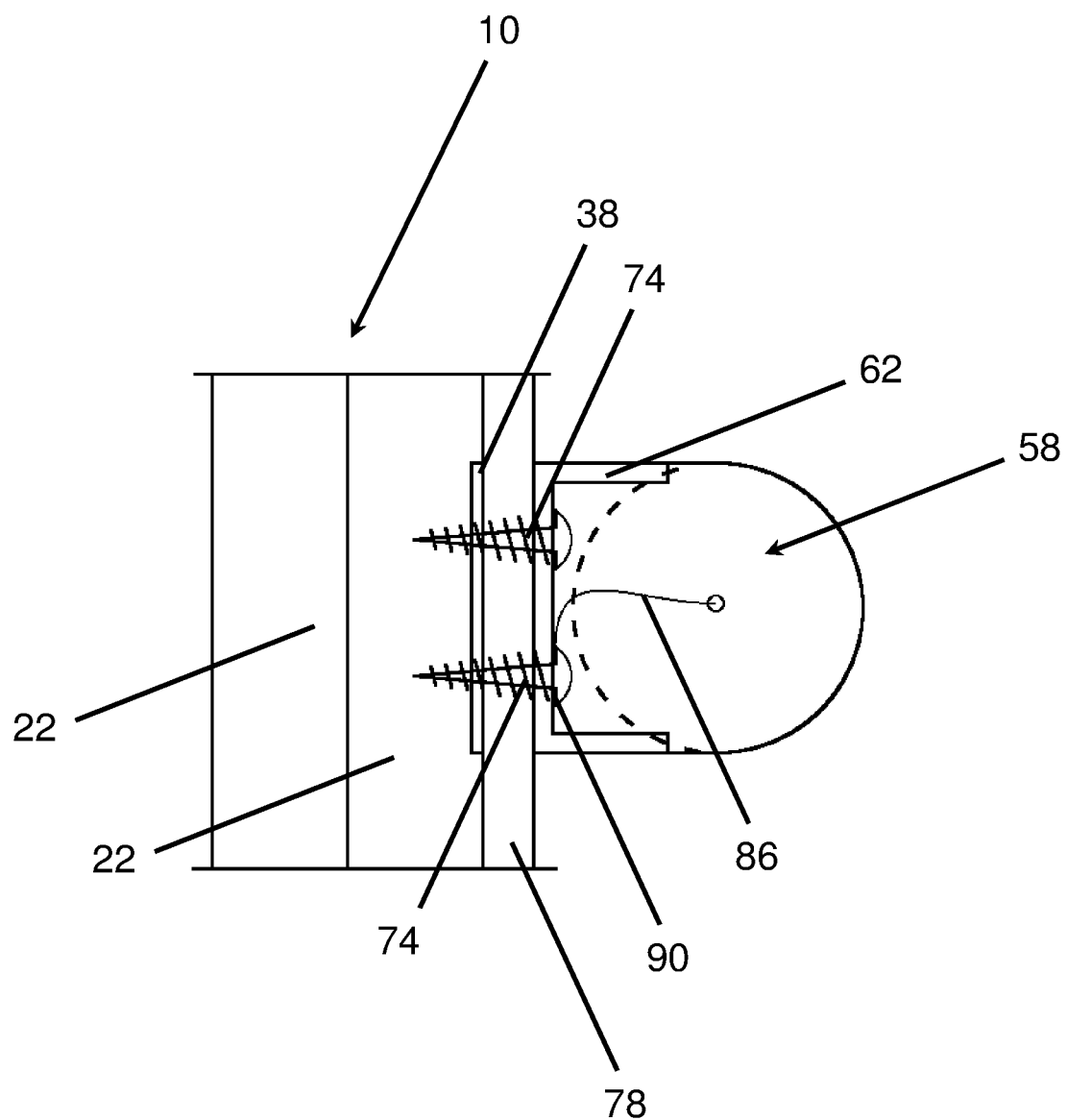
FIG. 9 shows another detailed drawing of the electrical distribution system.

FIG. 9 shows a detailed end view of an installed motorized window covering 58. The window covering 58 is installed outside of the window opening 26 on the face of the wall 10. Mounting brackets 62 are used to mount the window covering 58 to the wall 10. The window covering 58 includes a controller and a motor (not shown) which are used to open or close a window shade, curtain, etc. The mounting brackets 62 are attached to the wall 10 by mounting screws 74. As discussed, the wall includes framing members such as studs 22 and is covered by an electrically insulating wall panel 78 such as sheetrock. The electrical mounting plates 38 are embedded in the wall 10 beneath the sheetrock 78.

The mounting screws 74 pass through holes in the mounting brackets 62, through the sheetrock 78, and through the electrical mounting plates 38. The mounting screws 74 make electrical contact with the electrical mounting plates 38 and thereby complete an electrical circuit to provide power to the motorized window covering 58. As shown, the window covering 58 may include power wires 82 which are connected to the controller and which connect electrically to the screws 74. As shown, the power wires may extend out of the ends of the window covering housing and may be terminated with a ring terminal. The mounting screw 74 passes through the ring terminal, mounting bracket 62, sheetrock 78, and electrical mounting plate 38 to thereby electrically connect the electrical mounting plate to the controller 66. The mounting bracket 62 may be permanently attached to the window covering housing.

Figure 10:
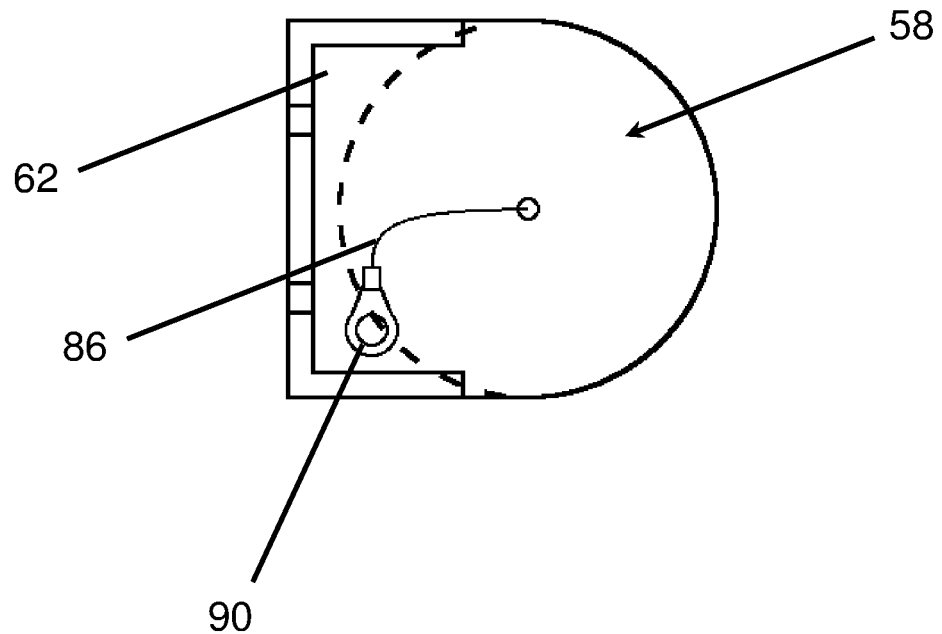
FIG. 10 shows a detailed drawing of the electrical system mounting bracket.
Figure 11:
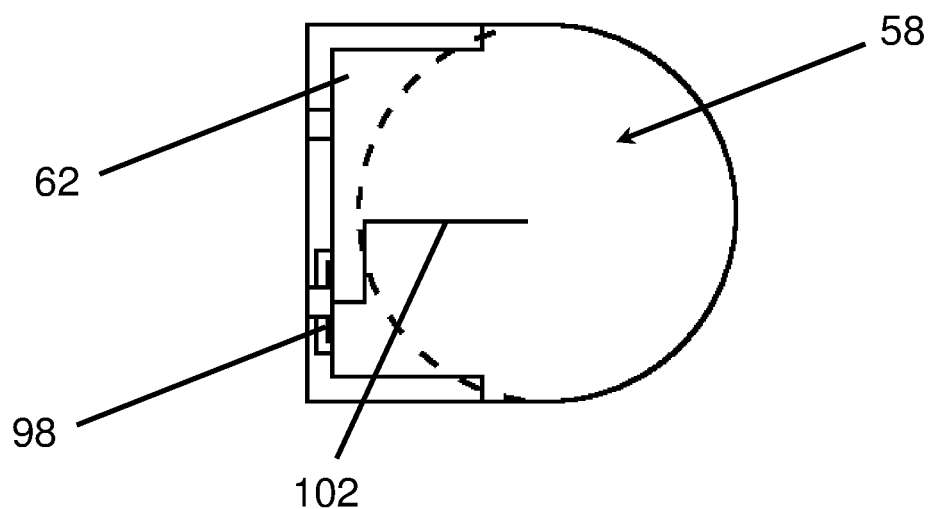
FIG. 11 shows a detailed drawing of the electrical system mounting bracket.

FIG. 10 shows how the window covering 58 may include a wire 86 which exits the housing near the mounting bracket 62 and terminates in a ring terminal 90. FIG. 11 shows how the mounting bracket 62 may alternately include an electrical contact pad 98 and trace 102 which are connected electrically to the window covering controller. Power is provided to the window covering 58 when the mounting screw 74 electrically connects the window covering input contact with the embedded electrical mounting plate 38.

The embedded electrical mounting plates may be used to provide electrical power to low power devices such as motorized window coverings. Electrical mounting plates are preinstalled during construction of the building so that they are placed between the wall framing members and the interior sheetrock/finishing panel. The electrical mounting plates are more than an inch wide and long and formed from a thin metal plate. They are commonly between 3 and 6 inches wide and long. The electrical mounting plates are connected to wires which run through the wall to a remotely located power supply which provides low voltage electricity to the electrical mounting plates. A single power supply may be used to provide electricity to a large number of installed devices throughout the building, eliminating exposed wiring and individual power supplies plugged into wall outlets for each window covering device.

The above description of illustrated examples of the present invention, including what is described in the Abstract, is not intended to be exhaustive or to be limiting to the precise forms disclosed. While specific examples of the invention are described herein for illustrative purposes, various equivalent modifications are possible without departing from the broader scope of the present claims. Indeed, it is appreciated that specific example dimensions, materials, voltages, etc., are provided for explanation purposes and that other values may also be employed in other examples in accordance with the teachings of the present invention.

What is claimed is:

1. A building electrical system comprising:
a first electrical mounting plate attached to a wall beneath a wall interior finishing panel such that the first electrical mounting plate is physically and electrically isolated from an interior surface of the wall;
a second electrical mounting plate attached to the wall beneath the wall interior finishing panel such that the second electrical mounting plate is physically and electrically isolated from the interior surface of the wall and such that the second electrical mounting plate is electrically isolated from the first electrical mounting plate;
a first wire which passes through an interior of the wall and connects the first electrical mounting plate to a power supply, wherein the power supply is located remotely from the first electrical mounting plate;
a second wire which passes through an interior of the wall and connects the second electrical mounting plate to the power supply, wherein the power supply is located remotely from the second electrical mounting plate;
wherein the first electrical mounting plate is connected to an electrical common output from the power supply;
wherein the second electrical mounting plate is connected to a positive electrical output from the power supply;
a low power electrical fixture mounted to the wall by first and second mounting screws, wherein the first mounting screw penetrates the wall interior finishing panel and penetrates the first electrical mounting plate and thereby electrically connects the fixture to the first electrical mounting plate, and wherein the second mounting screw penetrates the wall interior finishing panel and penetrates the second electrical mounting plate and thereby electrically connects the fixture to the second electrical mounting plate; and
wherein electricity is provided to the fixture via the first and second mounting screws.

2. The building electrical system of claim 1, wherein the wall interior finishing panel comprises gypsum board and wherein the first electrical mounting plate and the second electrical mounting plate are disposed between the wall interior finishing panel and wall framing members.

3. The building electrical system of claim 1, wherein the first electrical mounting plate is attached at a first side of a window opening, wherein the second electrical mounting plate is attached at a second side of the window opening, and wherein the low power fixture is a motorized window covering.

4. The building electrical system of claim 3, wherein the first mounting screw attaches a first mounting bracket to the wall, wherein the second mounting screw attaches a second mounting bracket to the wall, and wherein the first and second mounting bracket support the motorized window covering.

5. The building electrical system of claim 3, wherein the first and second mounting screws are electrically connected to first and second motorized window covering wires which provide power to a motorized window covering controller.

6. The building electrical system of claim 1, wherein the power supply provides low voltage power to the first and second electrical mounting plates.

7. The building electrical system of claim 1, wherein the first and second electrical mounting plates each have a length and width which is greater than 1 inch.

8. The building electrical system of claim 1, wherein the first and second electrical mounting plates are mounted to the wall parallel to the wall interior finishing panel.

9. A building electrical system comprising:
a first electrical mounting plate located inside of a building wall at a first location adjacent a window;
an electrically insulating interior wall panel covering the first electrical mounting plate and isolating it electrically from a face of the wall;
a first electrical distribution wire electrically connected to the first electrical mounting plate, the first electrical distribution wire extending through the building wall to a second location which is separated from the electrical mounting plate;
a low voltage power supply connected to the first electrical distribution wire at the second location;

a motorized window covering mounted to the wall adjacent the first electrical mounting plate;

wherein the motorized window cover is mounted to the wall by a first mounting screw which passes through the interior wall panel and is fastened to the first electrical mounting plate, and wherein the first mounting screw transmits power from the first electrical mounting plate to the motorized window covering.

10. The building electrical system of claim 9, further comprising:

a second electrical mounting plate located inside of a building wall at a third location adjacent the window;

wherein the electrically insulating interior wall panel covers the second electrical mounting plate and isolates it electrically from the face of the wall;

a second electrical distribution wire electrically connected to the second electrical mounting plate, the second electrical distribution wire extending through the building wall to the second location;

wherein the low voltage power supply is connected to the second electrical distribution wire at the second location;

wherein the motorized window cover is mounted to the wall by a second mounting screw which passes through the interior wall panel and is fastened to the second electrical mounting plate, and wherein the second mounting screw transmits power from the second electrical mounting plate to the motorized window covering;

wherein the first electrical mounting plate is connected to electrical common at the low voltage power supply and wherein the second electrical mounting plate is connected to positive voltage at the low voltage power supply.

11. The building electrical system of claim 10, wherein the first electrical mounting plate is attached at a first side of the window and wherein the second electrical mounting plate is attached at a second side of the window.

12. The building electrical system of claim 10, wherein the first mounting screw attaches a first mounting bracket to the wall, wherein the second mounting screw attaches a second mounting bracket to the wall, and wherein the first and second mounting bracket support the motorized window covering.

13. The building electrical system of claim 10, wherein the first and second mounting screws are electrically connected to first and second motorized window covering wires which provide power to a motorized window covering controller.

14. The building electrical system of claim 9, wherein the first electrical mounting plate has a length and a width which are each greater than 10 times a thickness of the first electrical distribution wire.

15. A building electrical system comprising:

a first electrical mounting plate located inside of a building wall;

a second electrical mounting plate located inside of a building wall;

an electrically insulating interior wall panel covering the first electrical mounting plate and the second electrical mounting plate and isolating the first electrical mounting plate and the second electrical mounting plate electrically from a face of the wall;

a low voltage power supply which is located remotely from the first electrical mounting plate and the second electrical mounting plate;

a first electrical distribution wire electrically connecting the first electrical mounting plate to the low voltage power supply, the first electrical distribution wire extending through the building wall between the first electrical mounting plate and the low voltage power supply;

a second electrical distribution wire electrically connecting the second electrical mounting plate to the low voltage power supply, the second electrical distribution wire extending through the building wall between the second electrical mounting plate and the low voltage power supply;

a low power electrical fixture mounted to the wall by a first mounting screw which extends through the interior wall panel and penetrates the first electrical mounting plate and a second mounting screw which extends through the interior wall panel and penetrates the second electrical mounting plate whereby power is provided to the electrical fixture via the first mounting screw and the second mounting screw.

16. The building electrical system of claim 15, further comprising:

wherein the first electrical mounting plate and the second electrical mounting plate are located in a first building room and wherein the low voltage power supply is located in a second building room.

17. The building electrical system of claim 15, wherein the first electrical mounting plate is attached at a first side of a window opening in the wall, wherein the second electrical mounting plate is attached at a second side of the window opening, wherein the electrical fixture is a motorized window covering mounted to the wall adjacent the window opening.

18. The building electrical system of claim 17, wherein the first mounting screw attaches a first mounting bracket to the wall, wherein the second mounting screw attaches a second mounting bracket to the wall, and wherein the first and second mounting bracket support the motorized window covering.

19. The building electrical system of claim 17, wherein the first and second mounting screws are electrically connected to first and second motorized window covering wires which provide power to a motorized window covering controller.

20. The building electrical system of claim 15, wherein the first electrical mounting plate has a length and a width which are each greater than 10 times a thickness of the first electrical distribution wire.

* * * * *